US012345588B2

(12) United States Patent
Bullin (10) Patent No.: US 12,345,588 B2
(45) Date of Patent: Jul. 1, 2025

(54) DYNAMOMETER SYSTEM FOR TESTING PERFORMANCE OF DRILLING TOOLS

(71) Applicant: DASH DRILLING PRODUCTS, LLC, Bryan, TX (US)

(72) Inventor: Keith Bullin, Bryan, TX (US)

(73) Assignee: DASH DRILLING PRODUCTS, LLC, Bryan, TX (US)

( * ) Notice: Subject to any disclaimer, the term of this patent is extended or adjusted under 35 U.S.C. 154(b) by 368 days.

(21) Appl. No.: 17/967,882

(22) Filed: Oct. 17, 2022

(65) Prior Publication Data

US 2023/0120228 A1    Apr. 20, 2023

Related U.S. Application Data

(60) Provisional application No. 63/256,519, filed on Oct. 15, 2021.

(51) Int. Cl.
*G01L 3/20* (2006.01)
*E21B 41/00* (2006.01)

(52) U.S. Cl.
CPC ............... *G01L 3/20* (2013.01); *E21B 41/00* (2013.01)

(58) Field of Classification Search
CPC .................... G01L 3/20; E21B 41/00
USPC ......................................... 73/865.9
See application file for complete search history.

(56) References Cited

U.S. PATENT DOCUMENTS

| | | |
|---|---|---|
| 8,863,591 B2 | 10/2014 | Leicht |
| 9,695,808 B2 | 7/2017 | Giessbach et al. |
| 10,119,333 B2 | 11/2018 | Bullin |
| 10,156,498 B2 * | 12/2018 | Jeanson ............... G06F 30/20 |
| 10,386,272 B2 * | 8/2019 | Jeanson ............ G01M 99/008 |
| 2017/0184474 A1 * | 6/2017 | Jeanson ............... G01V 20/00 |
| 2019/0094111 A1 * | 3/2019 | Jeanson ............ G01M 99/008 |

FOREIGN PATENT DOCUMENTS

| | | | |
|---|---|---|---|
| CN | 104819858 A | * | 8/2015 |
| CN | 103712790 B | * | 4/2016 |
| CN | 107727347 A | * | 2/2018 ............ G01M 13/00 |

* cited by examiner

*Primary Examiner* — John Fitzgerald
(74) *Attorney, Agent, or Firm* — Halit N. Yakupoglu (57) ABSTRACT

The present disclosure provides a test system including a dynamometer to test downhole drilling tools. The system includes a torque load application tool, a thrust load application tool, and a side or radial load application tool to test downhole drilling tool.

14 Claims, 10 Drawing Sheets

DYNAMOMETER SYSTEM FOR TESTING PERFORMANCE OF DRILLING TOOLS

CROSS REFERENCE TO RELATED APPLICATION

This application relates to and claims priority from U.S. provisional patent application No. 63/256,519 filed on Oct. 15, 2021, which is expressly incorporated by reference herein in its entirety.

BACKGROUND

Field of the Invention

The present invention generally relates to systems that test the performance of subterranean downhole motors used in oilwell drilling applications and, more particularly, to systems that can test downhole motor performance in simulated downhole conditions.

Description of the Related Art

The downhole motors are well-known drilling tools driven by high pressure drilling fluids known as drilling mud.

In drilling technologies, especially in petroleum drilling technologies, depending on the geology of the subterranean formations, drilling conditions can be affected by various factors such as geological characteristics, corrosive fluids, high temperatures and high pressures in the subterranean formations.

It is greatly advantageous to test and optimize important performance parameters of drilling tools under anticipated drilling loads, such as side loads, torsional loads and thrust loads, for example, before operating them in such varying subterranean conditions, or after a failed operation.

Conventionally, various types of dynamometers (dynos) are used to test performance of drilling tools under predetermined loads simulating the drilling conditions. A dynamometer can measure the torque and speed of a drilling tool under applied loads simulating the real operating conditions.

Testing of the drilling tool can be done by applying a counter force or resistance simulating the anticipated loads, for example, using a brake apparatus of the dynamometer, acting against the torque generated by the downhole motor running on the test bench of the dynamometer.

However, conventional dynamometers often have shortcomings such as lack of alternative load tests and difficulties in maintaining continuous tests with friction brakes which can be prone to overheating due to mechanical friction.

From the foregoing, there is a need for new dynamometer systems having improved load tests and improves brake designs allowing efficient dissipation and removal of heat.

SUMMARY

An aspect of the present invention includes a test system for testing a downhole drilling tool during a test, including: a test fluid source containing a test fluid; a test stand to hold the downhole drilling tool having a nonrotatable part including a mud motor and a rotatable part including a bit box, a drive shaft configured to be rotated by the mud motor rotates the bit box, wherein the mud motor is in fluid communication with the test fluid source to operate the mud motor to translate a rotational motion to the drive shaft; a reactive assembly including a rotatable housing and a nonrotatable housing, a torque transfer shaft, extending through the rotatable housing and the nonrotatable housing, having a first end in the rotatable housing and a second end in the nonrotatable housing, wherein the first end of the torque transfer shaft rotatably connected to the drive shaft at the bit box so that as the torque shaft is rotated by the rotational motion received from the mud motor both the bit box and the rotatable housing rotate during the test; a torque load test tool of the test system to apply torque loads to the downhole drilling tool during the test, the torque test tool includes a pump having an actuator rotationally coupled to the second end of the torque transfer shaft to receive the rotational motion from the mud motor to run the pump, the pump receives the test fluid from the test fluid source through a pump inlet valve and discharge it as a discharge flow from a pump discharge valve; a control valve being configured to selectively apply a braking force to the pump by restricting the discharge flow so as to apply torque loads the downhole drilling tool; a side load tool of the test system to apply side loads to the drilling tool during the test; and a thrust load tool of the system to apply thrust loads to the drilling tool during the test.

Another aspect of the present invention includes a test system for testing a downhole drilling tool including an externally rotatable section including a bit box and an externally stationary section including a mud motor, including: a test fluid tank, containing a test fluid; a test fluid pump to flow the test fluid to the downhole drilling tool that is tested; a torque test tool, including a pump, to apply torsional loads to the downhole drilling tool; a reactive assembly having an externally rotatable first housing and an externally stationary second housing, wherein the externally rotatable first housing is connected to the bit box of the downhole drilling tool and the externally stationary second housing is connected to the pump, wherein the reactive assembly is configured to transfer a rotational motion generated at the mud motor to the pump to run the pump for applying torsional loads to the downhole drilling tool; a side load tool of the test system to apply side loads to the drilling tool; and a thrust load tool of the system to apply thrust loads to the drilling tool.

Another aspect of the present invention includes a method of testing a downhole drilling tool using a test system, including: securing the downhole drilling tool on a test stand of the test system, the downhole drilling tool having a nonrotatable section including a mud motor and a rotatable section including a bit box having a drive shaft configured to be rotated by the mud motor, wherein a test fluid pump flows a test fluid from a test fluid source to the downhole drilling tool to run the mud motor; connecting a reactive assembly of the test system to the bit box, the reactive assembly including a rotatable housing and a nonrotatable housing, a torque transfer shaft, extending through the rotatable housing and a nonrotatable housing, having a first end in the rotatable housing and a second end in the nonrotatable housing, wherein the first end of the torque transfer shaft rotatably connected to the drive shaft through the bit box; connecting the second end of the torque transfer shaft to a torque load test tool of the test system to apply torsional loads to the downhole drilling tool, the torque load test tool includes a pump and an actuator of the pump being coupled to the second end of the torque transfer shaft to receive a rotational motion from the mud motor to run the pump, wherein the pump receives the test fluid from the test fluid source through a pump inlet valve and discharge it as a discharge flow from a pump discharge valve; selectively apply a braking force to pump by restricting the discharge flow of the test fluid from the pump using a control valve to apply torque loads to the downhole drilling tool; applying side loads to the drilling tool by a side load tool of the test system; and applying thrust loads to the drilling tool by a thrust load tool of the test system.

It should be understood that the above referenced drawings are schematic, not necessarily drawn to scale, as their dimensions may be varied considerably without departing from the scope of the present disclosure.

DETAILED DESCRIPTION

Before explaining the present invention in detail, it is to be understood that the system is not limited to the particular embodiments and that it may be practiced or carried out in various ways. The present invention may provide an improved dynamometer for testing drilling tools, for example, including but not limited to, a drilling downhole motor or mud motor, top drive, power swivel, rotatory steerable systems, or the like used in drilling technologies to reach subterranean reservoirs such as oil or gas reservoirs.

The present invention provides a dynamometer system, or a test system, to test rotating drilling tools, such as downhole drilling tools, with external forces including side loads, torsional loads, and thrust loads with or without using a test fluid flow.

The test system may be advantageously powered by a motor of the tested tool, for example by a mud motor, if a downhole drilling tool is being tested by the test system of the present invention. In this respect, the tested tool may be any tool including a drilling mud motor, top drive, power swivel, or rotatory steerable system, or the like.

A torque pump of the test system may be used as the primary torque test tool for applying torque to the downhole drilling tool that is being tested. A reactive assembly of the test system, which may be rotatably connected to the torque pump, may be used to apply forces, such as torque, side loads and thrust (load on and load off) on the drilling tool.

The test system, as a dynamometer, with computer control may simulate the functions of a drilling tool by adjusting and/or turning on and off various parameters to simulate the actual usage of the drilling tool in a drilling operation and collect the measured data including torque, side loads, thrust, temperature and pressure.

The test system may include the following components: (1) one or more test fluid source or tank, (2) a test platform including one or more support apparatus to support the drilling tool that is tested; (3) a reactive assembly which may be mechanically connected to the drilling tool to simulate drilling operations; (4) a torque test tool, torque pump, which may be connected to the reactive assembly of the test system for applying braking forces in addition to applying thrust and side loads to the drilling tool that is tested; (5) side loads application and thrust loads application mechanisms, or tools, to apply side loads and thrust to the rotating drilling tool; and (6) a system control unit having a server, or a computer, including a processor, or controller, in communication with sensors, gauges, of the test system and other instrumentation to control test process and a data storage to store collected test data and other data.

During the test, to run the mud motor of the tested drilling tool and to power the torque pump, a test fluid (commonly a liquid, such as water with or without impurities) from a test fluid tank or test fluid source may be pumped by a test fluid pump to the drilling tool.

An exemplary test fluid pump may be a pump using a piston, or a plunger, for pump action. An exemplary test fluid pump may be a duplex pump, a triplex pump, or a quintuplex pump, or a drilling mud pump. As the test fluid travels through the drilling tool, it activates the mud motor which results in rotating a drilling shaft that may be rotatably attached to the mud motor via a cv rod at a first end of the drilling shaft.

A first end of a torque transfer shaft, or mandrel, in the reactive assembly may be connected to a second end of the drilling shaft of the tested drilling tool. The second end of the drilling shaft may a be bit box where a drilling bit (bit) may normally be attached to the drilling tool. The bit is removed from the bit box before the test so that the first end of the torque transfer shaft may be rotatably connected to the drilling shaft of the tested drilling tool.

A second end of the torque transfer shaft may be rotatably connected to a torque pump via a cv rod, or cv joint assembly. This way, the rotation of the drilling shaft of the tested tool causes the torque pump to run. A control valve or similar restriction in the output of the torque pump causes the drilling tool to produce additional work. The reactive assembly may be similar in nature to a lower section of a drilling mud motor containing bit, thrust, radial, and misalignment correction means with the test fluid flow directed out of the side of the reactive assembly.

In this configuration, in the test system, the reactive assembly may be seen as replacing the drill bit or a drill bit section of the tested drilling tool having the related components of the bit so that any predetermined test force applied on the reactive assembly may simulate the forces on the drill bit operating in the actual operation conditions mentioned above.

The data of the applied predetermined loads by the test tools of the test system, i.e., torsional loads (torque), side loads, and thrust loads to the drilling tool connected to the reactive assembly as well as the test fluid flow data such as test fluid pressure, test fluid speed (RPM of the pumps upping the test fluid), and other data, may be collected by the system control unit of the test system during a test.

In the test system, the test fluid flowing through the drive shaft of the drilling tool may enter the torque transfer shaft in a rotating portion of the reactive assembly and exits from a fluid outlet at the side of a nonrotating portion of the reactive assembly. Test structures of the thrust load test tool and the side load (radial load) test tool may be used on the nonrotating portion of the tested drilling tool to stabilize and securely hold that portion. The reactive assembly may be also further stabilized and secured by the thrust load test tool and the side load test tool by providing additional support for the nonrotating portion of the reactive assembly housing as its internal components spin, e.g., the torque transfer shaft.

In order to test thrust loads, the thrust load test tool including one or more hydraulic cylinders is clamped on nonrotating portions of the drilling tool at one end and on the nonrotating portions of the reactive assembly at the other end. Once the thrust load test tool is installed, thrust loads may be applied in either direction using the hydraulic cylinders, or hydraulic pistons, to apply compressing or stretching forces (thrust forces) along the rotation axis of the tested drilling tool and the reactive assembly housing. The side load test tool, including at least one hydraulic cylinder is used to test the drilling tool by applying a radial loads or side loads on the reactive assembly which will result in a similar force on the drilling tool which is tested.

Torque pump may be the torsional load test tool, or the torque test tool of the test system. Torque pump may be a plunger action pump or positive displacement pump, such as pumps known as triplex pump or a similar pump powered by the rotational motion transferred by the mud motor of the tested drilling tool. The test system may include one or more torque pumps, such as two or three torque pumps. In one embodiment the test system may have two 1000 HP triplex pumps. The torque pump may use a pump fluid such as a water based liquid, water, or a different composition liquid such as an oil. In one embodiment, the pump fluid may be received from and, after used in a pumping cycle, returned to the test fluid tank of the test system. The pump fluid and the test fluid may be the same fluid and supplied from the test fluid tank. Alternatively, the torque pump may have its own pump fluid tank or fluid source to use.

During the test, the rotational motion transferred through the reactive assembly to the torque pump may rotate a pump rotor of the torque pump, which in turn reciprocates a plunger within the torque pump housing containing the test fluid. The plunger may be movably connected to a pump rotor via a shaft. As the plunger moves back and forth within the pump body, the test fluid flows from the test fluid tank into the torque pump body via an inlet valve and released back to the test fluid tank via an outlet valve of the torque pump.

The torque pump may be connected to the torque transfer shaft of the reactive assembly via a cv-rod and a pinion or a similar shaft of the torque pump. In this configuration, rotational motion generated by the mud motor of the tested drilling tool causes the torque pump to run due to the connection established by the reactive housing of the test system. A controllable back pressure may be applied to the torque pump as a braking force which may causes the torque pump to require more work and place further strain on the tested drilling tool providing the torque that runs the torque pump.

Instrumentation and sensors may be placed throughout the test system to collect real time temperature, pressure, and flow data throughout the test, by the control system. Heat exchangers may be placed locations that are needed in the system to remove unwanted heat.

The test system of the present invention differs from the conventional dynamometers (dynos) which use a friction brake and have difficulty maintaining continuous tests. Furthermore, the test system of the present invention may allow bulk work to be placed directly into the test fluid which provides an efficient way to remove heat. Further, the system of the present invention conducts side load and thrust load tests in addition to torque test to the drilling tool being tests.

Figure 1A:
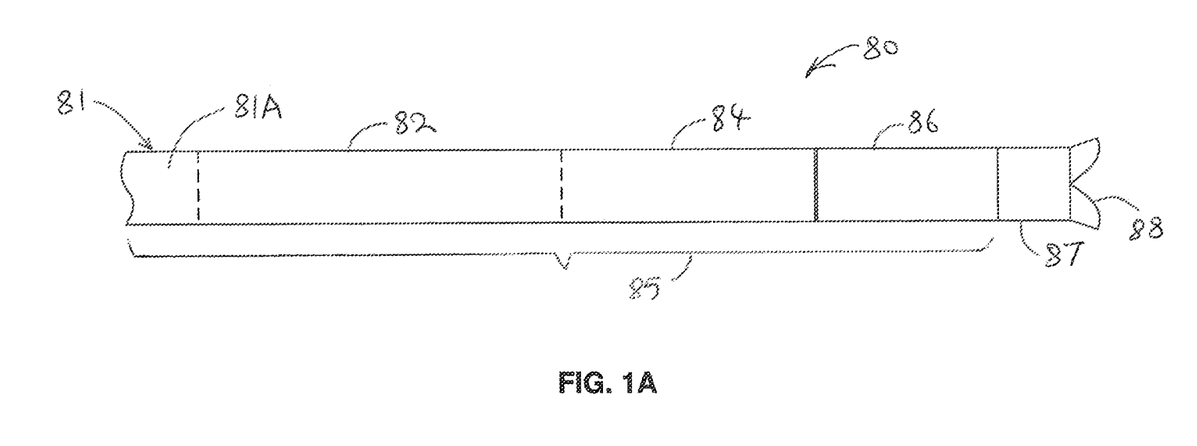
FIGS. 1A-1B are schematic illustrations of an exemplary downhole drilling tool to be tested using a test system of the present invention.
Figure 1B:
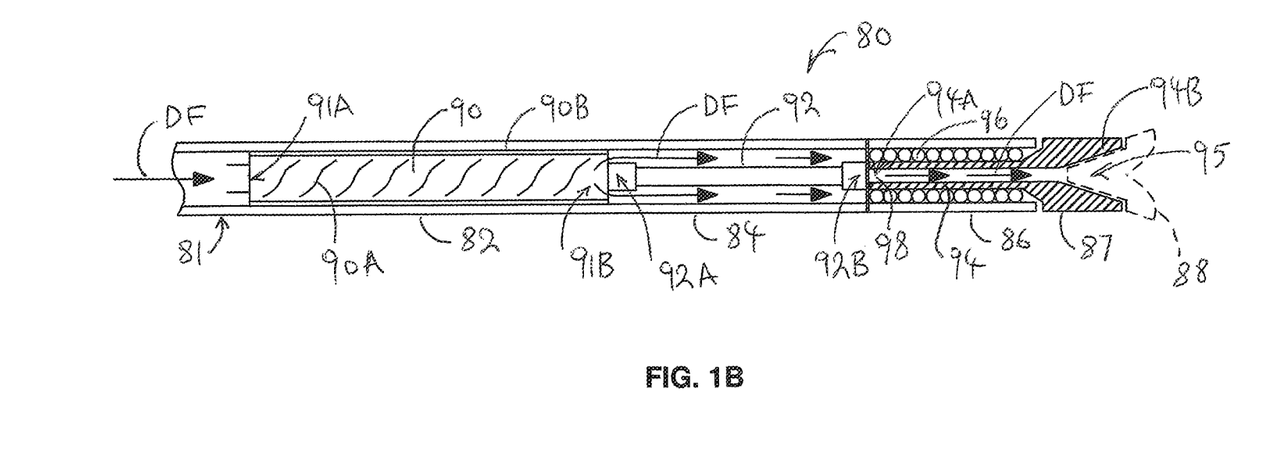

Turning now to the figures, FIGS. 1A-1B show an exemplary downhole drilling tool. FIGS. 1A-1B show exterior and interior of an exemplary downhole drilling tool 80, respectively, which will be referred to as the drilling tool hereinafter. The drilling tool 80 will be tested using a test system of the present invention which will be fully described below.

The drilling tool 80 may include a power housing 82, a bent housing 84, a bearing housing section 86, a bit box 87 and a drill bit 88 held by the bit box 87. In actual use, the power housing 82 may be connected to an end portion 81A of a drill string 81 of connected pipes as is common in drilling technologies. During the test, the end portion 81A of the drill string 81 may or may not be a part of the drilling tool 80. The end portion 81A of the drill string 81, the power housing 82, the bent housing 84 and the bearing housing 86 are cylindrical housings including cylindrical outer walls having a predetermined thickness.

The bent housing 84 may be bendable or unbendable depending on the design of the drilling tool being tested. The end portion 81A of the drill string 81, the power housing 82, the bent housing 84, and the bearing housing 94 may form a nonrotating part of 85, or externally nonrotating part, of the body of the drilling tool 80 to be tested. The bit box 87 may form a rotating part of the body of the drilling tool 80. Before the test, the drill bit 88 may be removed from the bit box 87, as will be described below.

As shown in FIG. 1B, the power housing 82 includes a mud motor 90, or positive displacement motor, having a rotor 90A and a stator 90B. A first end 91A of the mud motor 90 may be attached to the drill string 81 to receive a drilling fluid DF, or the drilling mud. The bent housing 84 may have a cv-rod 92 (a rod having constant velocity joints (cv) at both ends). A first end 92A of the cv-rod 92 may be rotatably attached to the second end 91B of the power housing 82, and specifically to the rotor 90A, so that rotating rotor may transfer rotational motion to the cv-rod 92. A second end 92B of the cv-rod 92 may be rotatably attached to a first end 94A of a drive shaft 94 extending through the bearing housing 86 and ending at a conical bit attachment opening 95 of the bit box 87 at a second end 94B of the drive shaft 94, where the drill bit 88 is threaded in before a drilling operation. The space between an outer surface of the drive shaft 94 and the circular wall of the bearing housing 86 includes bearings 96. The drive shaft 94 is a hollow rod having a fluid channel 98 extending between the first and second ends 94A, 94B.

During an actual drilling operation, the drilling fluid DF, e.g., drilling mud, may enter the mud motor 90 from the first end 91A and rotates the rotor 90A, which in turn rotates the cv-rod 92 in the bent housing 84, which in turn rotates the drive shaft 94 and the bit box to transfer the rotation generated at the mud motor 90 to the attached drill bit 88. The drilling fluid DF travels from the mud motor 90, through the bent housing 84, to the fluid channel 98 and into the drill bit 88 to be discharged therethrough. As will be described below, in the test system 100 drilling fluid may be replaced with a test fluid.

Figure 2:
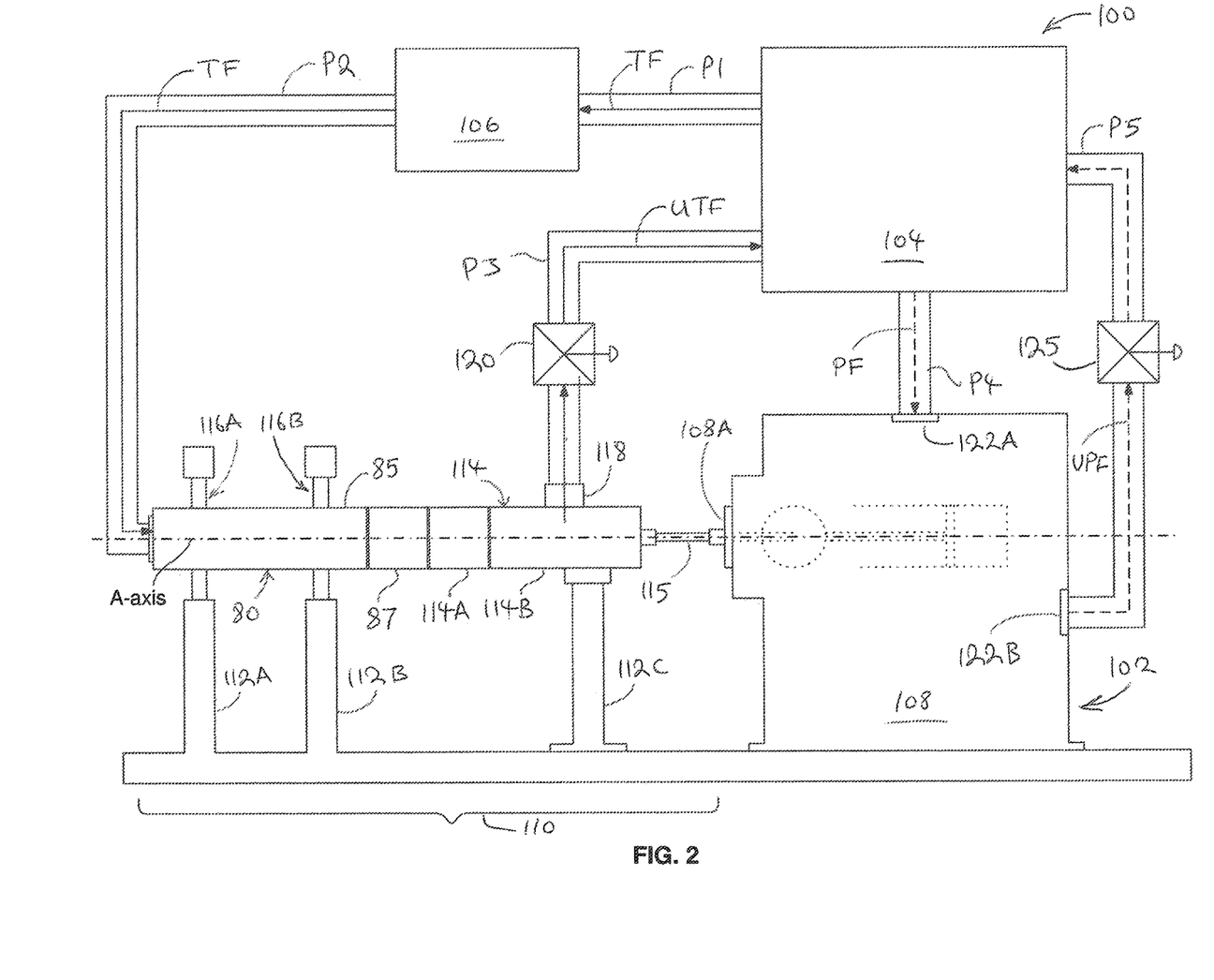
FIG. 2 is a schematic illustration of an embodiment of a test system of the present invention including a torque pump used a torque test tool to apply torsional loads to the downhole drilling tool.

FIG. 2 shows an embodiment of the dynamometer system 100 of the present invention with the drilling tool 80 to be tested. The dynamometer system 100 will be referred to as the test system 100 hereinafter. The test system may include a test platform 102, at least one test fluid tank 104 and a test fluid pump 106. The test platform 102 may include at least one torque pump 108 which is a torque test tool 108, or a torsional load test tool 108 of the test system, and a test stand 110, or a test bench 110, having support structures 112 or supports, such as, support structures 112A, 112B and 112C, located across the torque pump 108. The test platform 102 of the test system may also include a thrust load test tool 140 (FIG. 5) and a radial or side load test tool 150 (FIG. 6) which are not shown FIG. 2 for the clarity.

Figure 6:
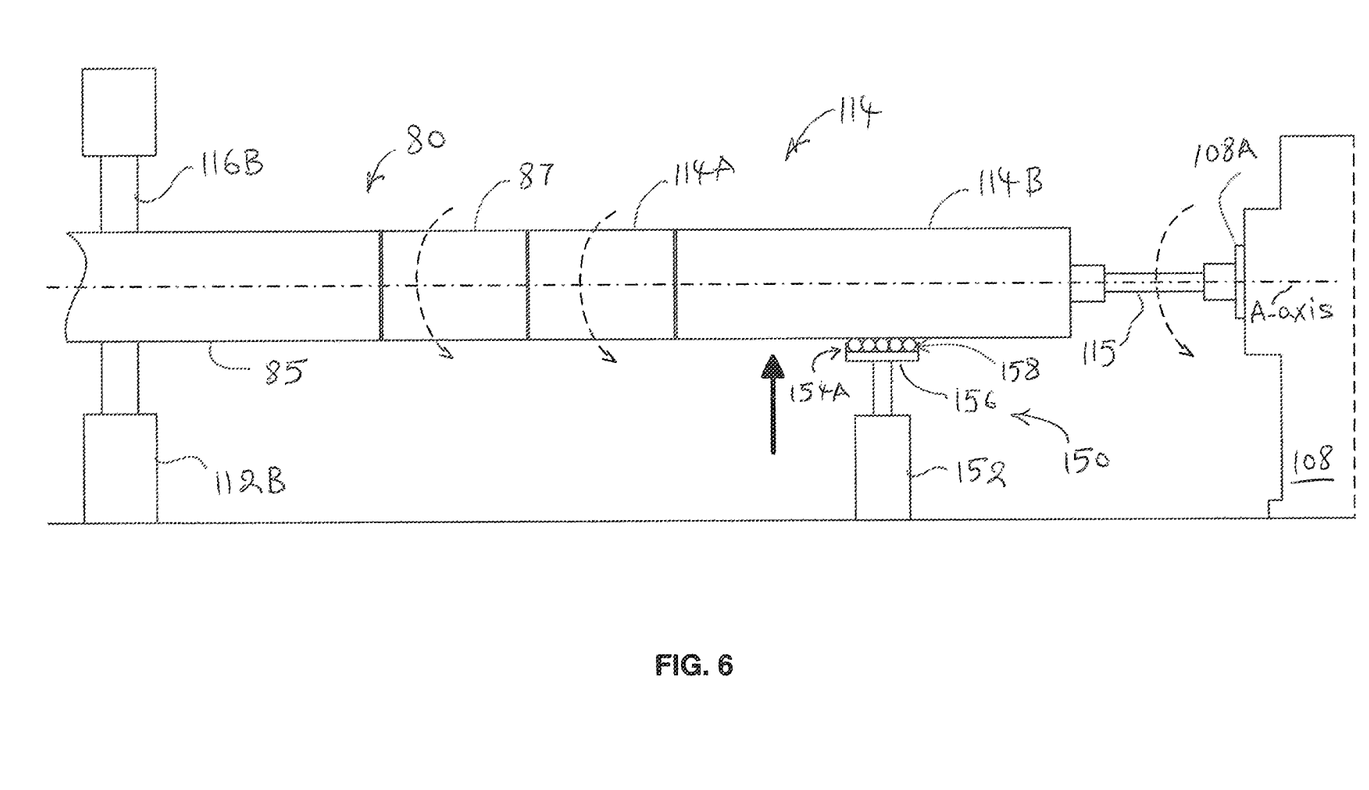
FIG. 6 is a schematic illustration of applying radial or side loads using a side load test tool of the test system.

The support structures 112 may have clamps on them to secure nonrotating part of the drilling tool and a reactive assembly 114 used during the test. The reactive assembly 114 of the test system 100 connects the drilling tool 80 in the test stand 110 to the torque pump 108. The reactive assembly 114 may include a front housing 114A, or a first housing 114A, which is rotatable and a back housing 114B, or a second housing 114B, which is stationary. The front housing 114A may be configured to be rotatably connected to the bit box 87 of the drilling tool 80. This way, as the bearing housing 86 rotates, the front housing 114A also rotates. The back housing 114B may be a nonrotating part and may connect the reactive assembly 114 to the torque pump 108 via a cv-rod 115 (rotatable), as will be described more fully below.

When connected to the reactive assembly 114, the clamps 116A, 116B of the supports 112A, 112B securely hold the nonrotating part 85 of the drilling tool 80. The support 112C may support the reactive assembly 114 or, alternatively, the side load test tool 150 (FIG. 6) may be used as a support in addition to be used as a side load test tool of the test system. When all three components, (1) the drilling tool 80, (2) reactive assembly 114 and (3) the cv-rod 115 between the reactive assembly and the torque pump 108 are assembled as a test column on the test platform 110, they may extend along an axis of rotation denoted as 'A-axis' shown in FIG. 2.

During a test process conducted by the test system 100, a test fluid TF stored in the test fluid tank 104 may be pumped by the fluid pump 106 into the drilling tool 80 via the pipelines P1 and P2. The test fluid TF may enter the test tool 80 from an inlet at the end of the non-rotating section 85 and runs the mud motor 90 generating rotational motion that is transferred to the torque pump 108 to run it. The test fluid TF flows through the non-rotating section 85, the bearing housing 86 (rotating) of the drilling tool 80, and continues flowing through the front housing 114A (rotating) and into the back housing 114B (nonrotating) of the reactive assembly 114. The used test fluid UTF may be flowed back to the test fluid tank 104 by a pipeline P3 connecting a fluid outlet 118 on the back housing 114B to an inlet of the test fluid tank 104. The fluid pipelines P1, P2 and P3 form a first fluid flow cycle FFC-1 of the test system. Pressure of the used test fluid UTF flowing through the pipeline P3 may be controlled by a choke valve 120, located on the pipeline P3 to reduce the pressure of the used test fluid by restricting flow.

Referring to FIG. 2, in one embodiment, the torque pump 108 may use the test fluid TF to operate as a pump. The test fluid TF received by the torque pump 108 will be referred to as pump fluid PF and the used fluid discharged from the torque pump 108 will be referred to as a used pump fluid UPF for clarity purposes. The pump fluid PF is received through an inlet valve 122A of the torque pump 108 and following the pumping cycle the used pump fluid UPF leaves the torque pump 108 through an outlet valve 122B. The pump fluid PF may be delivered to the torque pump 108 by a pipeline P4 connecting the test fluid tank 104 to the inlet valve 122A. The used pump fluid UPF (discharged) from the torque pump 108 may be delivered to the test fluid tank 104 by a pipeline P5 connecting the outlet valve 122B to the test fluid tank 104. The fluid pipelines P4 and P5 may form a second fluid flow cycle FFC-2 of the test system 100.

Flow of used pump fluid UPF may be controlled by a flow control valve 125, or a brake control valve 125, located on the pipeline P5 to produce a braking effect, by restricting the flow of the used pump fluid UPF, in the torque pump 108 that is running by the torque generated by the mud motor 90 of the drilling tool 80 being tested. In other words, by utilizing the flow control valve 125, a controllable back pressure may be applied to the torque pump 108 as a braking force which may causes the torque pump 108 to require more work and, as a result, place further strain on the tested drilling tool 80 that provides the torque that runs the torque pump 108. Torque application data may be obtained by a controller of the test system 100 by varying the flow restriction applied by the flow control valve 125.

For example, without any flow restriction at the flow control valve 125 and resulting zero braking force, the controller may read the lowest torque value of the drilling tool. This may be called zero braking force and zero applied load condition. As the UPF flow is gradually restricted by predetermined rates at the flow control valve 125, which results in increments in the braking force or resistance, the controller may read these higher torque values generated against the increased braking force at the torque pump 108. This may be called nonzero braking force, or increased braking force, and zero applied load condition. The measured torque values and the applied braking force may be stored in the data storage of the control system as torque performance data of the drilling tool 80 being tested.

Figure 5:
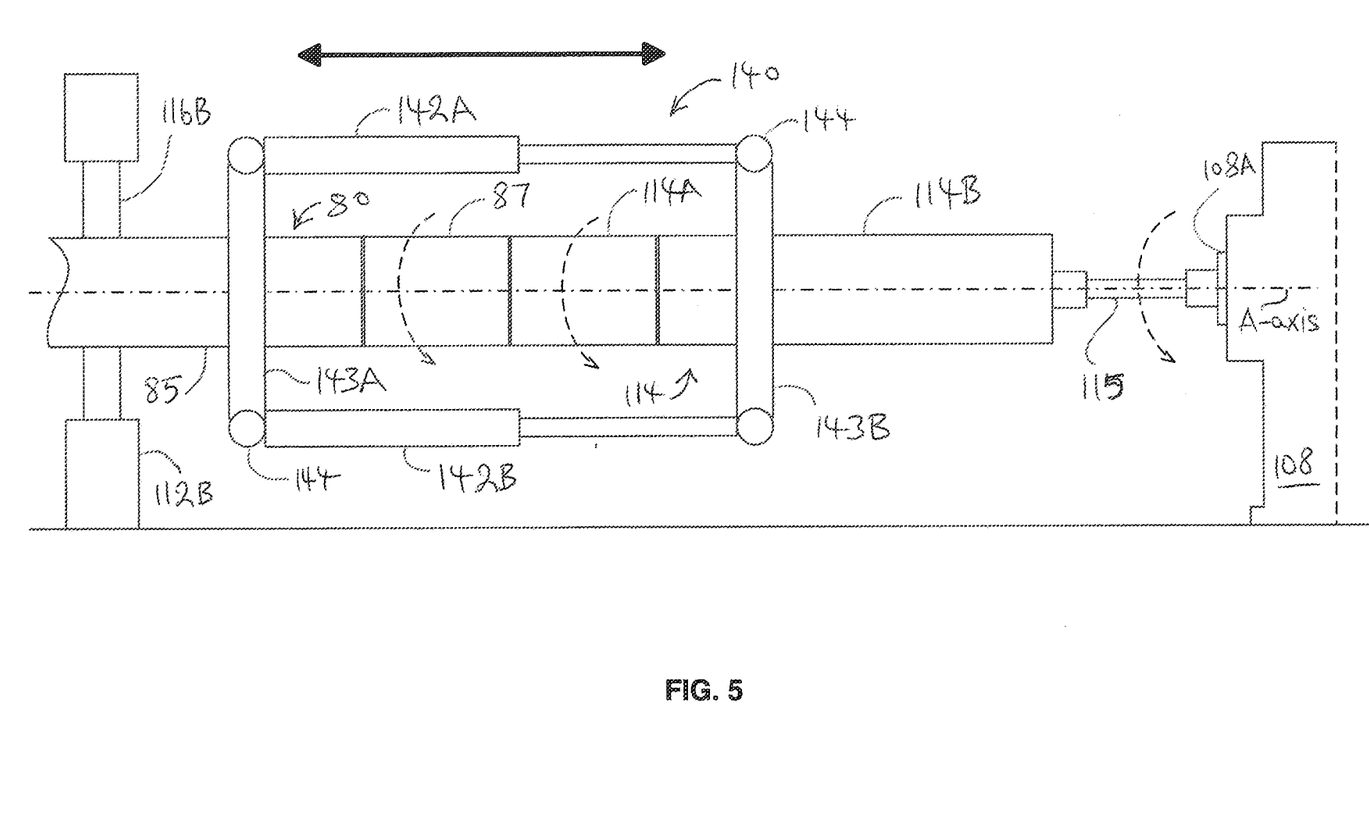
FIG. 5 is a schematic illustration of applying thrust loads using a thrust load test tool of the test system.

Torque measurement may also be done with or without applying braking force to the torque pump while applying also thrust loads by utilizing a thrust application tool as shown in FIG. 5 or while applying side loads by utilizing a side load application tool as shown in FIG. 6. The data of these tests may be collected by the controller and stored in the date storage as thrust performance data and as side load performance data of the drilling tool 80 being tested.

For example, without any flow restriction at the flow control valve 125 and resulting zero braking force, the controller may read the lowest torque value of the drilling tool when the thrust loads are applied by a thrust load mechanism 140 shown in FIG. 5. This may be called zero braking force and nonzero applied thrust load, or increased thrust load, condition. As the UPF flow is gradually restricted by predetermined rates at the flow control valve 125, which results in increments in the braking force or resistance, the controller may read these higher torque values, generated under thrust loads, against the increased braking force at the torque pump 108. This may be called nonzero braking force, or increased braking force, and nonzero applied thrust load, or increased thrust load, condition. These torque values generated under the predetermined thrust loads and with or without the applied braking force may be stored in the data storage of the control system as the data of torque performance under the thrust loads of the drilling tool 80 being tested.

For example, without any flow restriction at the flow control valve 125 and resulting zero braking force, the controller may read the lowest torque value of the drilling tool when the side loads are applied by a side load mechanism 150 shown in FIG. 6. This may be called zero braking force and nonzero applied side loads, or increased side loads, condition. As the UPF flow is gradually restricted by predetermined rates at the flow control valve 125, which results in increments in the braking force or resistance, the controller may read these higher torque values, generated under the side loads, against the increased braking force at the torque pump 108. This may be called nonzero braking force, or increased braking force, and nonzero applied side loads, or increased side loads, condition. These torque values generated under the predetermined side loads and with the applied braking force may be stored in the data storage of the control system as the data of torque performance under the side loads of the drilling tool 80 being tested.

Figure 3:
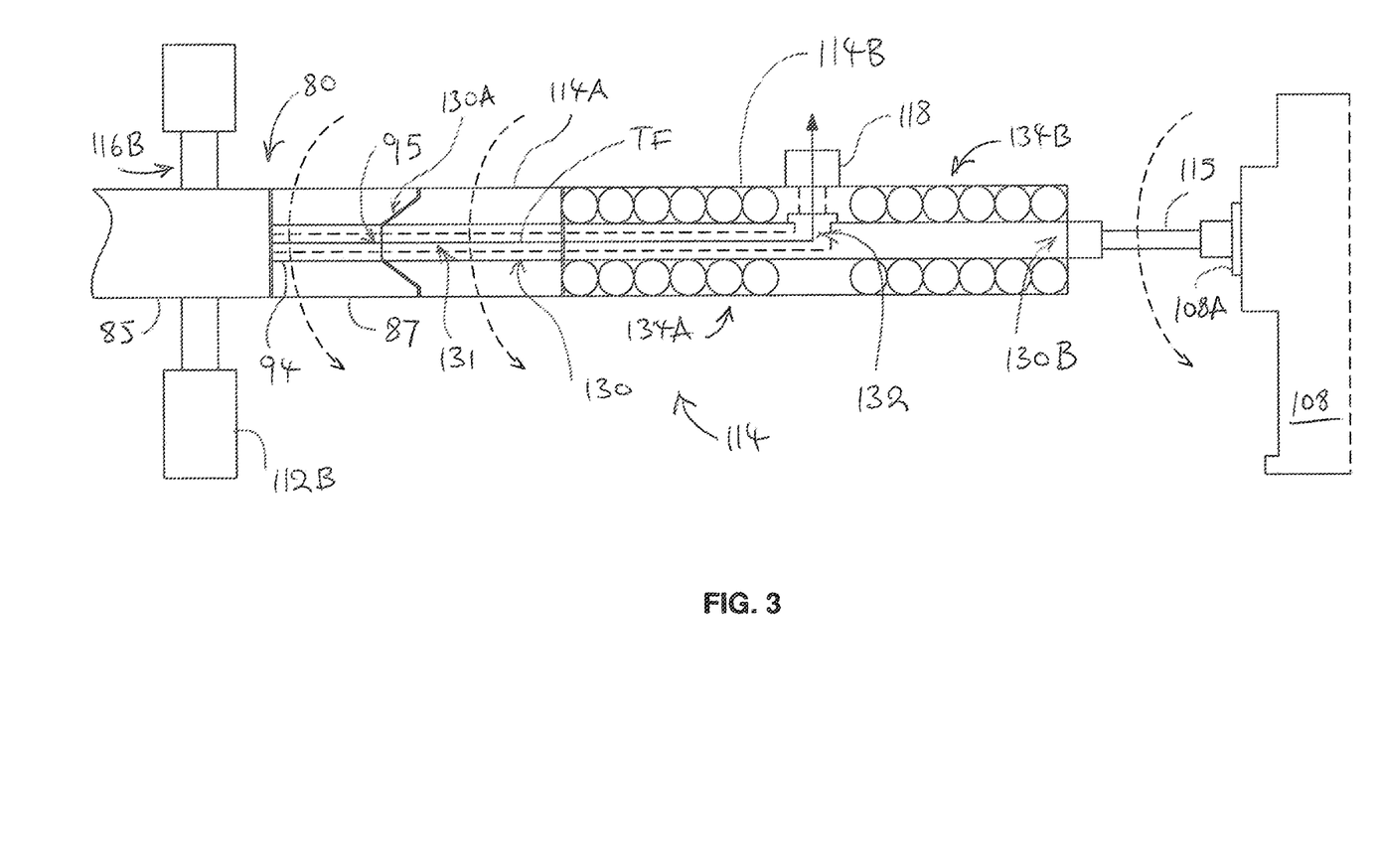
FIG. 3 is a schematic detail illustration of a section of the test system showing a drill shaft of the downhole drilling tool to be tested is connected to a reactive assembly of the test system.
Figure 4:
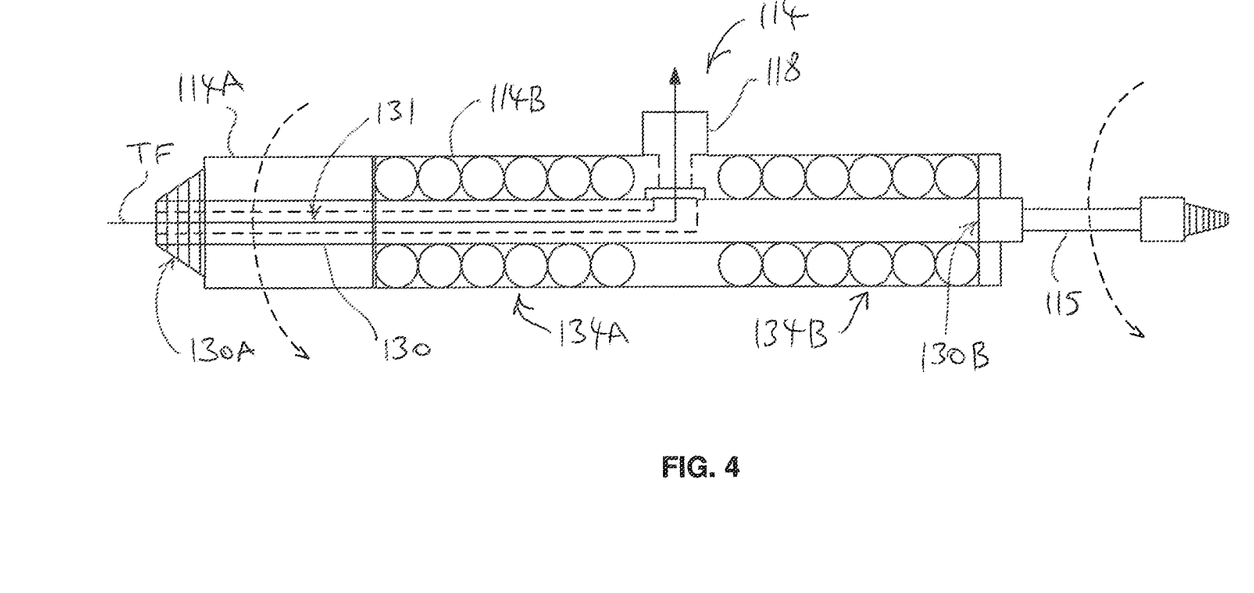
FIG. 4 is a schematic illustration of an embodiment of a reactive assembly of the test system.

FIG. 3 shows the reactive assembly 114 connecting the drilling tool 80 to be tested to the torque pump 108. FIG. 4 shows the reactive assembly 114 of the test system 100. Referring to FIGS. 3 and 4, a torque transfer shaft 130 of the reactive assembly 114 is rotatably connected to the drive shaft 94 of the drilling tool 80 at the bit box 97. The torque transfer shaft 130 may at least partially include a fluid channel 131 extending through its body. A first end 130A of the torque transfer shaft 130 is an integral part of the front housing 114A of the reactive assembly 114 and fastened to the opening 95 of the bit box 87 by threading into it, thereby rotatably connecting the drive shaft 94 of the drilling tool 80 to the torque transfer shaft 130.

The torque transfer shaft 130 may extend through the front and back housings 114A, 114B of the reactive assembly 114 and rotatably connected to the cv-rod 115 at a second end 130B of the torque transfer shaft 130. The test fluid TF flowing through the fluid channel 98 of the drive shaft may be delivered to the fluid channel 131 of the torque transfer shaft 130, and through an opening 132 in the torque transfer shaft the test fluid TF may flow out of the reactive assembly 114 via the fluid outlet 118 on the back housing 114B. In the back housing 114B, a first bearing assembly 134A and 134B may surround the torque transfer shaft 130 and rotatably support it so that as the torque transfer shaft 130 rotates about the A-axis (FIG. 2), the back housing 114B does not rotate and stays stationary.

The cv-rod 15 may connect the actuator 108A of the torque pump 108 to the second end 130B of the torque transfer shaft 130 to transfer the rotational motion generated at the mud pump of the drilling tool 80 to the torque pump 108 to power it during the tests. This way, the rotational motion generated at the mud motor of the drilling tool 80 transferred through the reactive assembly 114 to the torque pump 108 may rotate, for example, pump rotor of the torque pump 108, which in turn reciprocates a plunger of the torque pump 108 to operate. The plunger may be movably connected to a pump rotor via a shaft. As the plunger moves back and forth within the pump body, the test fluid flows from the test fluid tank into the torque pump via the inlet valve and released back to the test fluid tank via the outlet valve of the torque pump.

When the test fluid pumped into the drilling tool 80 and the mud motor 90 rotates the connected drive shaft and torque shaft during a test, both the front housing 114A connected to the bit box 87 of the drilling tool 80 also rotate while the second housing 114B of the reactive assembly 114 and the rest of the drilling tool 80 will stay stationary. In this configuration, when the test loads are applied, the front housing 114A rotated by the bit box 87 mimics a drill bit in actual drilling conditions. The test may be a various combinations of the torsional, radial, and thrust load applications to the drilling tool. In this respect, the same tests may be conducted without a test fluid flow, i.e., no rotation is generated by the mud motor and all the parts of the drilling tool and the reactive assembly 114 are stationary during the torsional, radial, and thrust load application tests.

FIG. 5 shows a thrust mechanism 140, or a thrust tool 140, of the test system 100 during an exemplary thrust load application test as the torque pump 108 is operating. The thrust tool 140 may include one or more hydraulic pistons 142. The embodiment shown in FIG. 5 includes two hydraulic pistons 142A and 142B connected to a first clamp 143A and second clamp 143B by connecting pins 144. The first clamp 143A may be firmly attached around the non-rotating section 85 of the drilling tool 80 and the second clamp 143B around the back housing 114B, which is a non-rotating section, of the reactive assembly 114. As the test fluid is pumped to the drilling tool 80 and the torque pump is activated, the thrust tool 140 is activated by the system controller, and hydraulic pistons 142A and 142B apply compressive or tensile loads along the A-axis to the test section between the clamps of the thrust tool, i.e., bit box 87 and the front housing 114A of the reactive assembly 114, to observe, for example, torque performance of the drilling tool 80 under "weight on bit" and "weight off bit" thrust conditions. The test system 100 may apply the trust tool 140 under zero and nonzero braking force conditions, as described above. System controller collects this data and store in the system data storage as thrust performance data of the drilling tool 80.

FIG. 6 shows a side-load tool 150, or a radial load tool 150, of the test system 100 during an exemplary side load application test as the torque pump 108 is operating. The side-load tool 150 may include at least one hydraulic piston 152 attached to a support member 154 including a base 156 which maybe a flat base or a curved base partially fitting to the curved surface of the back housing 114B. The base 156 may hold support rollers 158 forming a load surface which is in contact with the back housing 114B during the side-load test. During a side load test, the support member 154 is used to apply side loads to the back housing 114B of the reactive assembly 114 by controlling the hydraulic piston 152. As the test fluid is pumped to the drilling tool 80 and the torque pump is activated, the side-load tool 150 is activated by the system controller, and the hydraulic piston 152 pushes the support member 154 against the back housing 114B (non-rotating) to observe the torque performance of the drilling tool 80 under side load conditions. The side loads may be applied perpendicular to the A-axis. The test system 100 may apply the side-load tool 150 under zero and nonzero braking force conditions, as described above. System controller collects this data and store in the system data storage as the side load performance data of the drilling tool 80.

FIGS. 7A-9 show a system control unit 200 in connection with instrumentation of the test system 100 to collect test data and also to control test process. The system control unit 200 having a server including a processor 202, or controller, in communication with sensors and other instrumentation shown in FIGS. 7A-9 to control test process and a data storage 204 to store collected test data and other data.

Figure 7A:
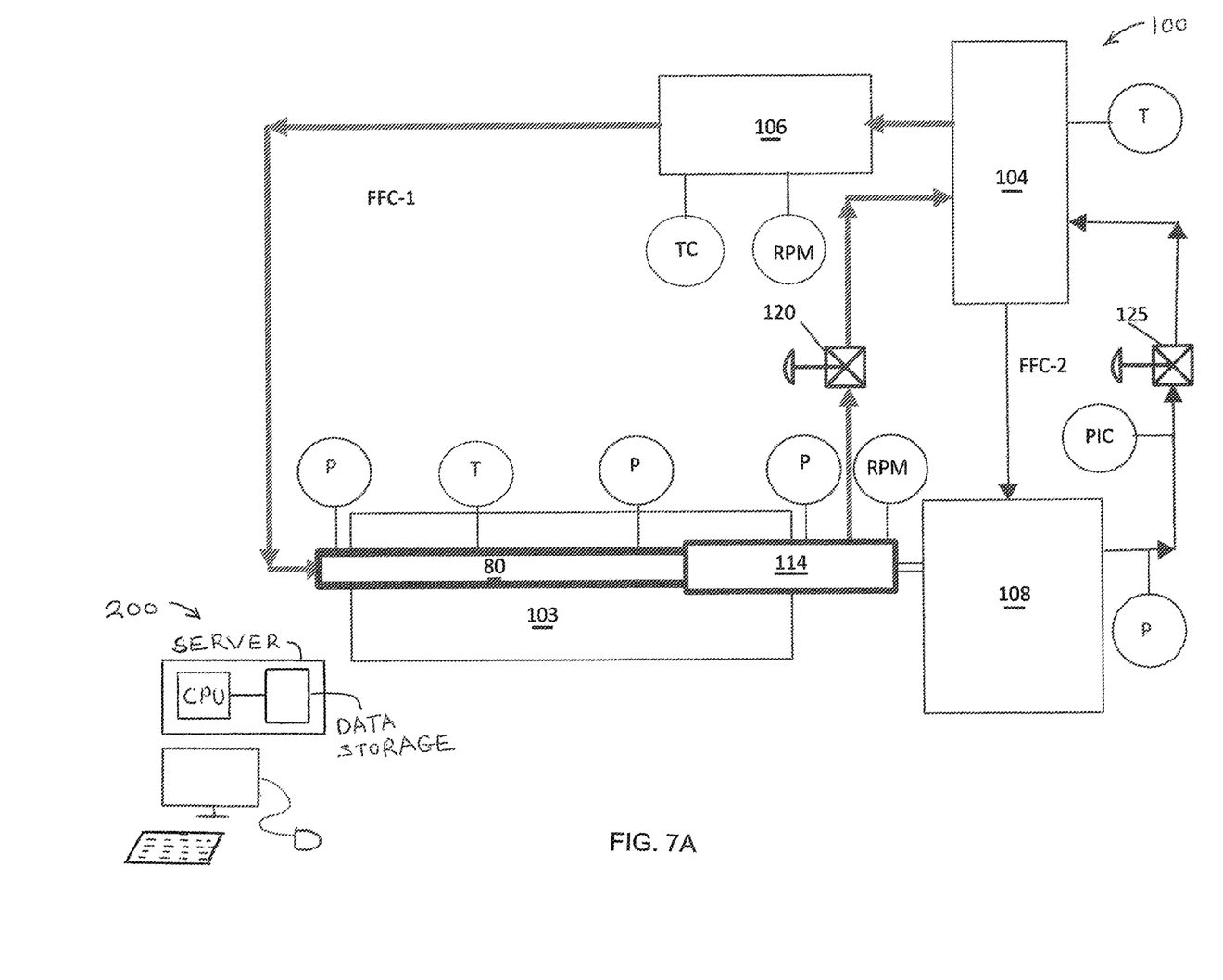
FIG. 7A is a schematic illustration of an embodiment of test system control instruments in connection with a system control unit controlling the test process flow using the instruments.
Figure 7B:
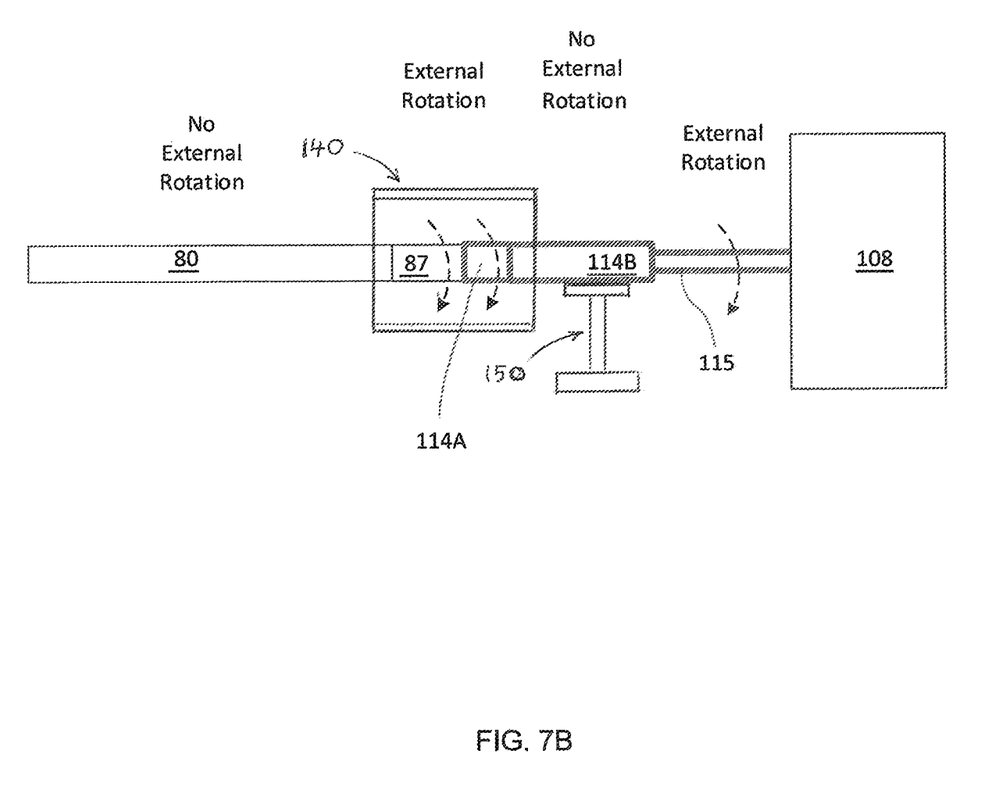
FIG. 7B is a schematic illustration of the torsional load test tool, a side load test tool and a thrust load test tool of the test system during a test of the downhole drilling tool.

FIGS. 7A-7B schematically shows an exemplary test process flow in the test system 100. including a system unit 200 including computing system having a processor a data storage unit and instruments or devices, i.e., sensors, gauges, meters, and the like, which may be electronically connected to the control system. The system data storage may be in the form of non-transitory computer readable medium configured to store files, programs, tables and executable computer instructions. A computer program product stored on a non-transitory computer readable medium may include instructions executable by the processor or controller of the server to operate the test system of the present invention.

As mentioned above, the purpose of the test system 100 is to test downhole drilling tools with external forces including side loads, torsional loads (torque), and thrust loads with a test fluid flow in order to mimic an actual drilling process operating for example in the subterranean formations.

Referring to FIGS. 1-6 and 7A-7B, the test system briefly includes: a test fluid tank 104 providing the test fluid for the first fluid flow cycle FFC-1 and the second fluid cycle FFC-2; a reactive assembly 114 which is connected to the drilling tool 80 to be tested during the test; the test tools, to apply test loads to the drilling tool 80, including: one or more torque pump(s) 108, or torsional load tools 108, to apply torsional loads (torque), a thrust load tool 140 to apply thrust loads, and a side load tool 150 to apply side loads 140; and, a control unit 200, or a control system, which may be electronically connected to the system sensors, gauges, meters, and the like, as shown in FIGS. 7A-9.

The reactive assembly 114 is connected to one end to the drilling tool 80 and the opposite end to the torque pump 108. The reactive assembly 114 receives the test fluid from the test fluid tank 104 with the first fluid flow cycle FFC-1. The test fluid pump 106 pumps the test fluid to the drilling tool 80. As the test fluid travels through the drilling tool 80 and runs the mud motor 90, or positive displacement motor, of the drilling tool 80. The rotational motion generated at the mud motor runs the torque pump 108 (torque test tool). The test fluid pump 106 may be a triplex drilling mud pump (including three pumps).

Furthermore, the reactive assembly 114 may be similar in nature to the lower section of a drilling mud motor containing thrust, radial, and misalignment correction means with the fluid flow directed out on the side of the assembly. A second control valve 120, or a pressure reducing choke valve 120, in the output of the reactive assembly 114 may be used to restrict the flow of test fluid to mimic conditions occurring when the fluid nozzles on the drill bit is blocked during an actual drilling operation.

The torque pump 108 may receive the test fluid with the second fluid flow cycle FFC-2. A first control valve 125, or similar restriction device, in the output of the torque pump 108 causes the drilling tool 80 to produce additional work or torque by restricting the test fluid flowing out of the torque pump 108. The torque pump 108 is powered (run) by the mud motor of the tested drilling tool. Any rotational forces generated by the tested tool will cause the torque pump 108 to turn. Additional back pressure can be added by the brake control valve 120 (the second control valve), which causes the torque pump 108 to require more work and place further strain on the drilling tool 80 being tested by the test system 100. The test system may have two or more torque pumps. The torque pump 108 may use the test fluid from the test fluid tank 104 or a separate test fluid from a second test fluid tank.

Figure 8:
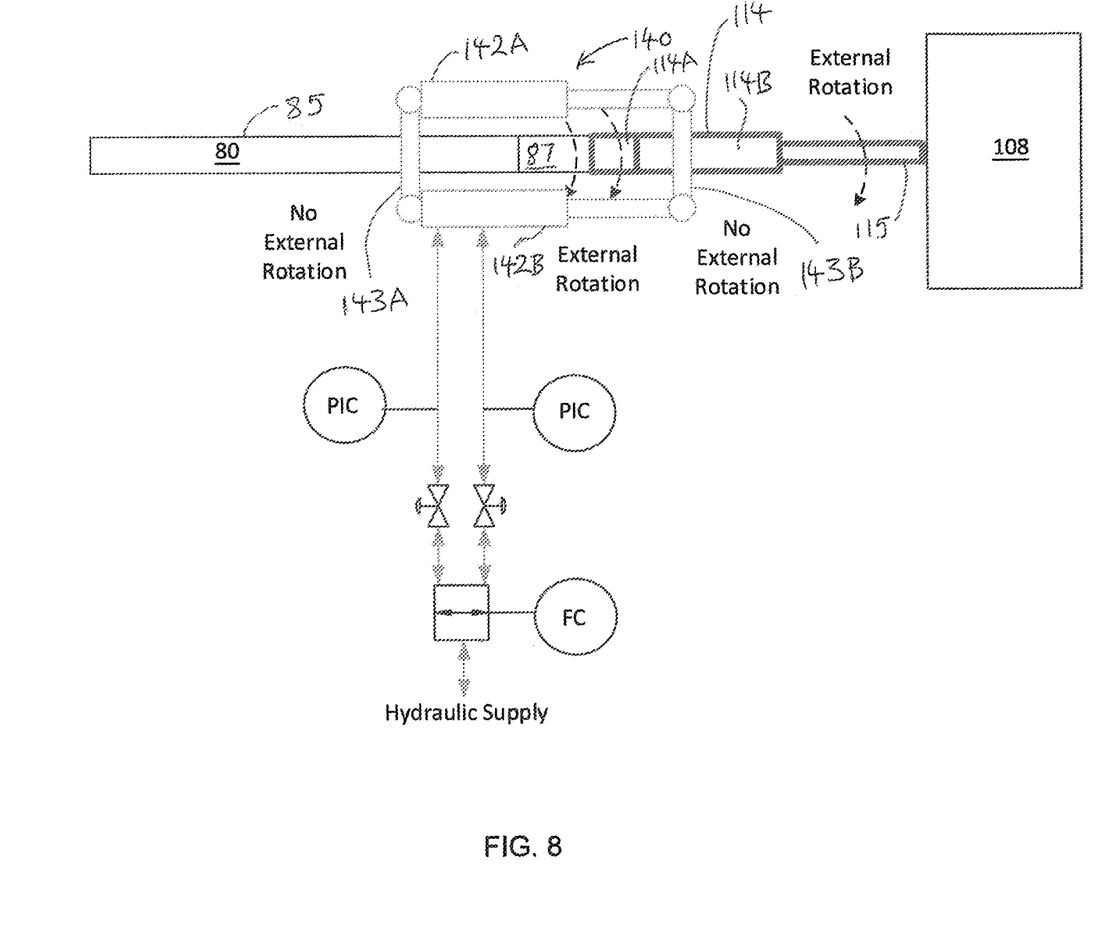
FIG. 8 is a schematic illustration of the thrust load test tool with the control instrumentation.

FIG. 8 demonstrates how thrust loads can be applied to the drilling tool 80 in either direction with one or more hydraulic cylinders of the thrust load tool 140. The clamp 143A of the thrust load tool 140 is placed on a nonrotating portion of the drilling motor 80 while the clamp 143B is placed on a nonrotating section of the reactive assembly 114.

Figure 9:
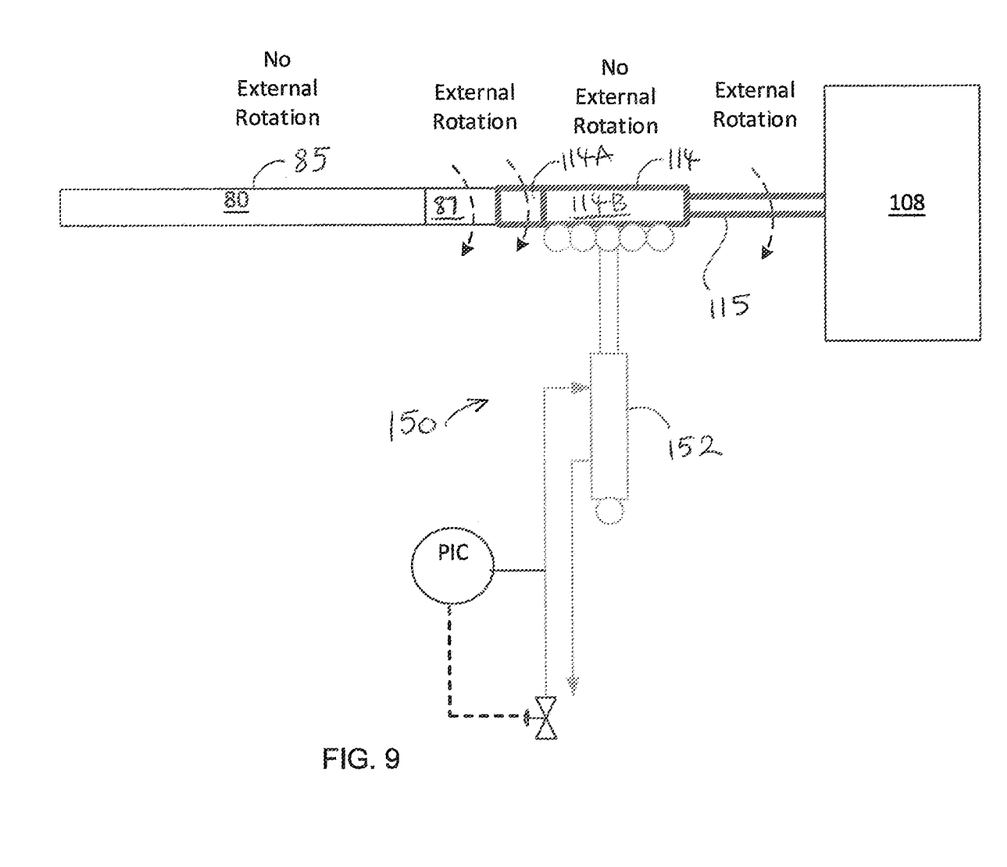
FIG. 9 is a schematic illustration of the side load test tool with the control instrumentation.

FIG. 9 demonstrates how the side (radial) loads can be applied to the drilling tool by the side load tool 150 using the hydraulic cylinder to apply a radial force on the reactive assembly which will result in a similar force on the drilling test tool. During the tests of the drilling tools, instrumentation, i.e. sensors, gauges, devices, is placed throughout the test system and the tested downhole drilling tool to collect real time temperature, pressure, and the test fluid flow data throughout the test. Heat exchangers are placed were needed in the system to remove unwanted heat. The test system may test a drilling mud motor, top drive, power swivel, or rotatory steerable systems.

FIGS. 7A, 8 and 9 show some exemplary instrumentation including: temperature sensors T, test fluid pressure sensors P, RPM sensors to determine speed of the test fluid, pressure indicator sensors PIC, throttle controllers TC.

The drilling tool may be tested by applying each test tool selectively, together, or varying combinations, such as, side loads and torque or thrust loads and torque, or side loads, thrust loads and torque. Each load may be applied on and off fashion for varying or constant durations.

An exemplary test process involving the application of thrust loads, side loads and torsional loads, or torque, may follow the following steps: (1) starting the test fluid pump 106 to deliver the test fluid to the drilling tool 80 under test, which will start running the torque pump 108; (2) applying the predetermined side loads using the side load tool 150; (3) applying predetermined torque and thrust loads by braking the torque pump using the brake control valve 125 and applying thrust loads by the thrust load tool 140; (4) removing the torque and thrust loads; and (5) removing the side loads. During the test process, RPM of the test fluid pump 106 and the torque pump 108 may be monitored establish set points to repeat the tests.

Exemplary Process Measurements:
  Temperature of Test Fluid Tank 104 (0-250 deg F.).
  RPM of Test Fluid Pumps 106 (0-600 rpm).
  Temperature at 8 locations in the drilling tool 80 (0-500 deg F.).
  Pressure at top of the drilling tool 80 (0-5000 psi).
  Pressure at bottom of drilling tool 80 (0-5000 psi).
  Pressure at bit location (0-5000 psi).
  RPM of test tool (and torque pump) (0-600 rpm).
  P Pressure output of Torque Pump 108 (0-5000 psi).

Exemplary Controllers:
  TC 1001: On/off and throttle control for (3) triplex mud pumps. This controller will cycle pumps on/off and to achieve desired flow rate.
  Brake control valve 125. Hydraulic pressure is applied to a hydraulic choke to restrict flow to pressure setpoint. The measured variables could be (a) Pressure before the choke valve 125 or (b) differential pressure across the drilling tool.

Thrust Tool (FIG. 8):
  Thrust can be applied On/Off bottom. Hydraulic pressure can be applied in either direction through valve FC to actuate hydraulic cylinder to create on or off bottom force. Hydraulic pressure regulates the magnitude of the force exerted by the cylinder.

Side Load Tool (FIG. 9):
  Hydraulic pressure is sent to the hydraulic cylinder. Hydraulic pressure regulates the force exerted by the cylinder.

Although aspects and advantages of the present invention are described herein with respect to certain embodiments, modifications of the embodiments will be apparent to those skilled in the art. Thus, the scope of the present invention should not be limited to the foregoing discussion, but should be defined by the appended claims.

I claim:

1. A test system for testing a downhole drilling tool during a test, comprising:
   a test fluid source containing a test fluid;
   a test stand to hold the downhole drilling tool having a nonrotatable part including a mud motor and a rotatable part including a bit box, a drive shaft configured to be rotated by the mud motor rotates the bit box, wherein the mud motor is in fluid communication with the test fluid source to operate the mud motor to translate a rotational motion to the drive shaft;
   a reactive assembly including a rotatable housing and a nonrotatable housing, a torque transfer shaft, extending through the rotatable housing and the nonrotatable housing, having a first end in the rotatable housing and a second end in the nonrotatable housing, wherein the first end of the torque transfer shaft rotatably connected to the drive shaft at the bit box so that as the torque shaft is rotated by the rotational motion received from the mud motor both the bit box and the rotatable housing rotate during the test;
   a torque load test tool of the test system to apply torque loads to the downhole drilling tool during the test, the torque test tool includes a pump having an actuator rotationally coupled to the second end of the torque transfer shaft to receive the rotational motion from the mud motor to run the pump, the pump receives the test fluid from the test fluid source through a pump inlet valve and discharge it as a discharge flow from a pump discharge valve;
   a control valve being configured to selectively apply a braking force to the pump by restricting the discharge flow so as to apply torque loads the downhole drilling tool;
   a side load tool of the test system to apply side loads to the drilling tool during the test; and
   a thrust load tool of the system to apply thrust loads to the drilling tool during the test.

2. The system of claim 1 further comprising a cv-rod, the cv-rod is configured to rotationally connect the second end of the torque transfer shaft to the actuator of the pump.

3. The system of claim 1, wherein the test fluid is pumped to the down hole drilling tool by a test fluid pump, wherein the test fluid pump includes a positive displacement pump.

4. The system of claim 1, wherein the side load tool of the test system applies side loads to the nonrotatable housing of the reactive assembly.

5. The system of claim 1, wherein thrust load tool of the test system applies thrust loads to both the rotatable housing of the reactive assembly and the bit box of the downhole drilling tool.

6. The system of claim 1, wherein the pump includes one of a plunger action pump and a positive displacement pump, run by rotational motion transferred from the mud motor of the downhole drilling tool.

7. The system of claim 1 further comprising a control unit having a computer including a data storage and a processor to control operation of the system and collect test data.

8. The system of claim 7, wherein the test data includes results of the torque load test tool, the side load test tool, the thrust load test tool, speed of the test fluid flowing in the down hole drilling tool, and pressure of the test fluid flowing into the down hole drilling tool.

9. The system of claim 1, wherein the drive shaft and the torque transfer shaft are at least partially hollow to allow test fluid to flow through them.

10. The system of claim 9, wherein the torque transfer shaft includes a flow hole in fluid connection with a test fluid outlet on the torque transfer housing to flow the test fluid running the mud motor back to the test fluid source.

11. A method of testing a downhole drilling tool using a test system, comprising:
    securing the downhole drilling tool on a test stand of the test system, the downhole drilling tool having a nonrotatable section including a mud motor and a rotatable section including a bit box having a drive shaft configured to be rotated by the mud motor, wherein a test fluid pump flows a test fluid from a test fluid source to the downhole drilling tool to run the mud motor;
    connecting a reactive assembly of the test system to the bit box, the reactive assembly including a rotatable housing and a nonrotatable housing, a torque transfer shaft, extending through the rotatable housing and a nonrotatable housing, having a first end in the rotatable housing and a second end in the nonrotatable housing, wherein the first end of the torque transfer shaft rotatably connected to the drive shaft through the bit box;
    connecting the second end of the torque transfer shaft to a torque load test tool of the test system to apply torsional loads to the downhole drilling tool, the torque load test tool includes a pump and an actuator of the pump being coupled to the second end of the torque transfer shaft to receive a rotational motion from the mud motor to run the pump, wherein the pump receives the test fluid from the test fluid source through a pump inlet valve and discharge it as a discharge flow from a pump discharge valve;
    selectively applying a braking force to pump by restricting the discharge flow of the test fluid from the pump using a control valve to apply torque loads to the downhole drilling tool;
    applying side loads to the drilling tool by a side load tool of the test system; and
    applying thrust loads to the drilling tool by a thrust load tool of the test system.

12. The method of claim 11, wherein a test fluid from a test fluid source to the downhole drilling tool is pumped by test fluid pump.

13. The method of claim 11, wherein the test fluid pump includes a positive displacement pump.

14. The system of claim 11, wherein the pump includes one of a plunger action pump and a positive displacement pump, run by rotational motion transferred from the mud motor of the downhole drilling tool.

* * * * *